United States Patent [19]

Peterman et al.

[11] Patent Number: 5,686,828
[45] Date of Patent: Nov. 11, 1997

[54] METHOD FOR LOCATING THE JOINTS AND FRACTURE POINTS OF UNDERGROUND JOINTED METALLIC PIPES AND CAST-IRON-GAS-MAIN-PIPELINE JOINT LOCATOR SYSTEM

[75] Inventors: Earl J. Peterman, Philo; David L. Peterman, Redwood Valley, both of Calif.

[73] Assignee: New York State Electric & Gas Corporation, Binghamton, N.Y.

[21] Appl. No.: 574,546

[22] Filed: Dec. 19, 1995

[51] Int. Cl.⁶ .................. G01N 27/00; G01K 31/08
[52] U.S. Cl. .................. 324/71.1; 324/523; 324/527; 324/326
[58] Field of Search .................. 324/522, 523, 324/527, 529, 530, 531, 71.1, 71.2, 326, 357; 73/592, 598

[56] References Cited

U.S. PATENT DOCUMENTS

| | | | |
|---|---|---|---|
| 1,893,311 | 1/1933 | West | 324/326 X |
| 3,849,722 | 11/1974 | Nilsson | 324/357 |
| 3,988,663 | 10/1976 | Slough et al. | 324/326 |
| 3,991,363 | 11/1976 | Lathrop | 324/522 X |
| 4,063,161 | 12/1977 | Pardis | 324/523 |
| 4,228,399 | 10/1980 | Rizzo et al. | 324/522 X |
| 4,390,836 | 6/1983 | Bruce et al. | 324/326 X |
| 4,449,098 | 5/1984 | Nakamura et al. | 324/326 |
| 5,001,430 | 3/1991 | Peterman et al. | 324/326 |
| 5,126,654 | 6/1992 | Murphy et al. | 324/263 X |
| 5,127,267 | 7/1992 | Huebler et al. | 73/584 |
| 5,404,104 | 4/1995 | Rivola et al. | 324/425 |
| 5,498,967 | 3/1996 | Bass et al. | 324/523 X |

Primary Examiner—Vinh P. Nguyen
Assistant Examiner—Diep Do
Attorney, Agent, or Firm—Thomas E. Schatzel; Law Offices of Thomas E. Schatzel A Prof. Corporation

[57] ABSTRACT

A method for locating the joints and fractures of underground cast iron gas mains comprises connecting several sections of an underground cast iron gas main pipeline across a sixty watt signal generator with an audio-frequency signal output of 7800 hertz. The connections take advantage of service lines, valve boxes and drip access at the surface, otherwise holes are drilled to accommodate contact probes. The signal passes through the pipe sections and their joints in series. The centerline of the underground cast iron gas main pipeline is plotted directly above on the surface of the ground, e.g., along a surface centerline. The relatively higher impedance of the pipe joints compared to the pipes themselves, causes current fluxes to radiate from each joint. The relative linear positions and their corresponding signal power measurements are collected along the surface centerline. The locations of the joints of the underground cast iron gas main pipeline are estimated to be directly below points on the surface centerline that provide signal power peaks.

10 Claims, 3 Drawing Sheets

METHOD FOR LOCATING THE JOINTS AND FRACTURE POINTS OF UNDERGROUND JOINTED METALLIC PIPES AND CAST-IRON-GAS-MAIN-PIPELINE JOINT LOCATOR SYSTEM

BACKGROUND OF THE INVENTION

1. Field of the Invention

The present invention relates generally to underground piping, and more specifically to equipment for locating the joints and fractures which are commonly the basis for leakage from underground cast iron gas pipelines.

2. Description of the Prior Art

Ripping up and exposing whole sections of buried gas main pipeline never was an effective way to maintain or repair such a common utility. A wide range of methods and equipment have been developed to maintain water, sewer, electric, telephone and gas pipelines that are buried and out of reach.

For detection and location, non-invasive and non-destructive methods are preferable, but usually suffer from low resolution and limited penetration. For example, synthetic aperture ground penetrating radars and dual-band infrared tomography have been employed to inspect metal structures that lie below a few feet of asphalt and concrete in roadbeds.

Rivola, et al., describe in U.S. Pat. No. 5,404,104, issued Apr. 4, 1995, a method for locating defects in the protective coverings of underground pipelines. A sine wave with different frequencies is applied to the pipeline and the corresponding voltage responses are measured. Comparisons are then made between the responses obtained at the different frequencies to gauge whether there has been any deterioration of the covering.

Above-ground magnetic sensors are used non-invasively by Murphy, et al., in U.S. Pat. No. 5,126,654, issued Jun. 30, 1992, for detecting the corrosion rate of buried metal pipelines. The method helps to avoid unnecessary excavation of the pipeline in order to maintain it.

So-called holidays in the insulating coating of underground pipelines are detected by a method and apparatus described by Bruce, et al., in U.S. Pat. No. 4,390,836, issued Jun. 28, 1983. An alternating current is connected to the pipeline, e.g., at test points provided for cathodic protection. Frequencies of 300 to 3,000 hertz are desired, and frequencies of 600 to 1,000 hertz are preferred. A truck equipped with magnetic coils at various attitudes collects the measurements.

A locator for buried metallic pipes which carry AC signals is described by Slough, et al., in U.S. Pat. No. 3,988,663, issued Oct. 26, 1976. A pickup coil with a ferro-magnetic core is connected to a tuned bandpass amplifier having an output connected to a headset and associated meter. Stronger signals mean closer proximity to a buried metal pipe.

The present inventors, Earl and David Peterman, describe an apparatus and method for locating concealed electrical conductors in U.S. Pat. No. 5,001,430, issued Mar. 19, 1991. The lateral position and depth of a conductor is determined with the use of a portable antenna array. The depth of objects is determined by the gain increase required to equalize the signals received by two antennas vertically displaced from one another. The lateral direction of the buried object is determined from the phase of the signals compared to a reference.

Although these and other methods are useful in locating a pipeline or in determining the state of deterioration of the pipeline or its protective coating, none have proven consistent in locating the longitudinal position of the joints or fractures of cast iron pipes, where most leaks develop in gas mains.

In the United States alone, more than 50,000 miles of cast iron pipe are still in active service. These provide natural gas to residential, commercial and industrial customers throughout northern states from Minnesota to Maine and as far south as Washington, D.C. From 1880 up until the time welded pipes became available in the 1930's, very low pressure gas utility pipelines were installed that used joint construction, e.g., as sewer pipes do with lead and oakum joints. These sections of cast iron pipe are in service today and range in standard lengths from nine to twelve feet. Familiar bell and spigot ends are used. Service fittings were installed wherever needed, usually by the "hot tap" method. Steel service lines were run from these fittings through curb valves to the customers' meters, and in the old days, to street lamps. Soil erosion and corrosion of the pipes have had their effects. Better than two-thirds of all joints have required repair in some districts. Usually, repairing the joints is still less expensive than replacing the lines.

SUMMARY OF THE PRESENT INVENTION

It is therefore an object of the present invention to provide a method for locating the joints and fractures of underground cast iron gas mains.

It is another object of the present invention to provide a method and system for locating the joints and fractures of underground jointed metallic lines and pipes.

It is a further object of the present invention to provide a method for locating the joints and fractures of underground cast iron gas mains that is dependable and accurate.

It is a another object of the present invention to provide a method for locating the joints and fractures of underground cast iron gas mains that requires little or no excavation of the pavement or soils to locate the pipe joints and fractures.

Briefly, a method embodiment of the present invention for locating the joints and fractures of underground cast iron gas mains comprises connecting several sections of an underground cast iron gas main pipeline across a sixty watt signal generator with an audio-frequency signal output of approximately 7800 hertz. The connections take advantage of service lines, valve boxes and drip access at the surface, otherwise holes are drilled to accommodate contact probes. The signal passes through the pipe sections and their joints in series. The centerline of the underground cast iron gas main pipeline is plotted directly above on the surface of the ground, e.g., along a surface centerline. The relatively higher impedance of the pipe joints compared to the pipes themselves, causes current fluxes to radiate from each joint. The relative linear positions and their corresponding signal power measurements are collected along the surface centerline. The locations of the joints of the underground cast iron gas main pipeline are estimated to be directly below points on the surface centerline that provide signal power peaks.

An advantage of the present invention is that a method is provided that locates the joints and fractures of underground cast iron gas main pipelines.

Another advantage of the present invention is that a method is provided for locating underground pipeline joints and fractures that is dependable and accurate.

A further advantage of the present invention is that a method is provided for locating pipe joints and fractures that is non-invasive or minimally-invasive.

These and other objects and advantages of the present invention will no doubt become obvious to those of ordinary skill in the art after having read the following detailed description of the preferred embodiments which are illustrated in the various drawing figures.

IN THE DRAWINGS

DETAILED DESCRIPTION OF THE PREFERRED EMBODIMENT

Figure 1:
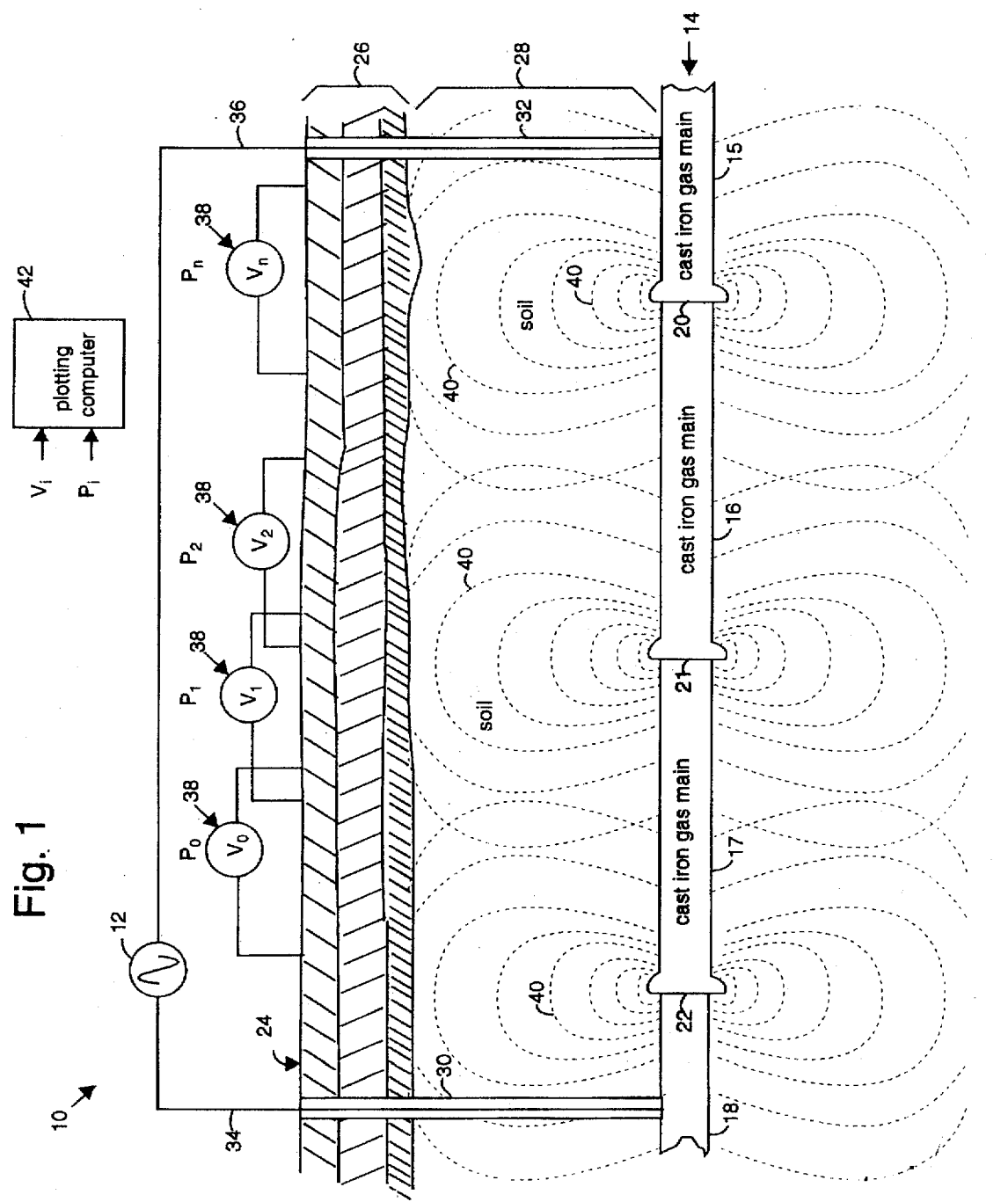
FIG. 1 is a longitudinal cross-section of a typical city street with an underground cast iron gas main connected to a signal generator and a receiver system used according to a method embodiment of the present invention.

FIG. 1 illustrates a cast iron pipe joint and fracture location system embodiment of the present invention, referred to herein by the general reference numeral 10. The system 10 comprises an audio frequency signal generator 12 that is connected in a closed circuit through an underground cast iron pipeline 14 that includes individual pipe sections 15-18 with corresponding bell joints 20-22. The underground cast iron pipeline 14 is typical of utility low pressure gas mains that run underground of the streets in the United States, e.g., at a depth of 30-50 inches and having diameters of 6-24 inches or more. It is also similar to jointed metallic pipelines in general that are used for sewer and water systems. The individual pipe sections 15-18 typically have service lines connected to subscribers' buildings along the street and come to the surface at a gas meter. Gas valves and drip pots also connect to the pipe sections 15-18 and appear at the surface of a road 24 that comprises a multiple layer pavement 26 over an overburden soil 28. Such pavement 26 is relatively non-conductive and soil 28 is often moist and relatively conductive. Contact between the signal generator 12 and the cast iron pipeline can be made opportunistically through fortuitously connected service lines, gas valves and drip pots. Otherwise, one or both of a pair of drill holes 30 and 32 can be bored from the surface to the pipeline 14, and a pair of sleeve insulated plunger bars 34 and 36 inserted to make electrical contact.

Preferably, the signal source 12 is configured to output an alternating current continuous wave (AC-CW) at about sixty watts with a stable crystal-controlled frequency of about 7800 hertz. Between six and twelve pipe joints, e.g., pipe joints 20-22, are desirable in the electrical circuit between the outputs of the signal generator 12. It is preferable to laterally offset the signal generator 12 more than twelve feet to one side of the centerline of the pipeline 14 projected normal to the surface of the road 24, e.g., to reduce spurious signal pickup.

A receiver system 38 is placed at a plurality of surface positions $P_0$-$P_n$ to gather a corresponding set of signal voltage measurements $V_0$-$V_n$. A crystal controlled oscillator (TCXO) and a phase locked loop (PLL) are preferably included in the receiver system 38 so that narrow bandwidth reception methods can be used to exclude adjacent channel and other spurious noise signals. Initial measurements are taken every one or two feet along the centerline of the pipeline on the surface of the road 24. The relatively higher impedance of the contacts between the individual pipe sections 15-18 at the joints 20-22 cause lines of a fringing current flux 40 to develop in the surrounding soil. Signal voltage peaks will be observed by the receiver system 38 at points directly above the joints 20-22 on the surface of road 24 equal in proportion to the impedance of each joint. These maximums tend to repeat every twelve feet which is the standard length of some cast iron pipes, thus reinforcing the conclusion at the surface by a crew that a joint has been located.

The worst joints typically produce the worst symptoms, e.g., gas leaks, Bad mechanical joints also tend to make poor electrical contact. The signal voltages developed at the surface of the road 24 will therefore generally be accentuated for the most deteriorated joints.

A computer 42 is connected to receive and plot the signal voltage measurements "Vi" taken at the corresponding positions "Pi" from the receiver system 38. The computer 42 can be as simple as a manually-tabulated list that is later converted to a hand-drawn chart, or may be as sophisticated as a fully electronic system that takes analog signal measurements and converts them to digital form for consumption by a microcomputer with a video display to show the plots. A real time kinematic survey quality satellite navigation receiver may be attached to the receiver system 38 to provide automatic position determinations to better than one centimeter for use by the plotting computer 42.

Figure 2:
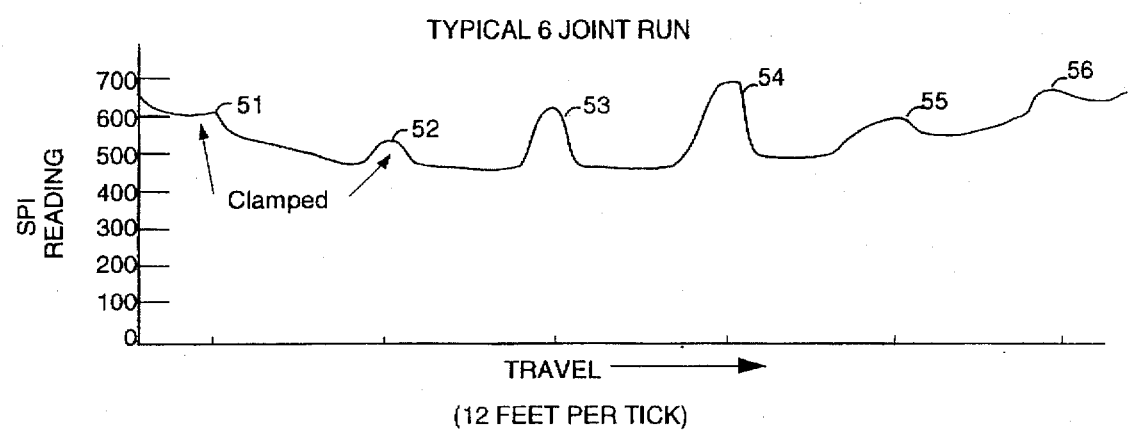
FIG. 2 is a graph of test readings that were taken at various longitudinal points at the street surface along a six section length of an underground cast iron gas main pipeline similar to that shown in FIG. 1.
Figure 3:
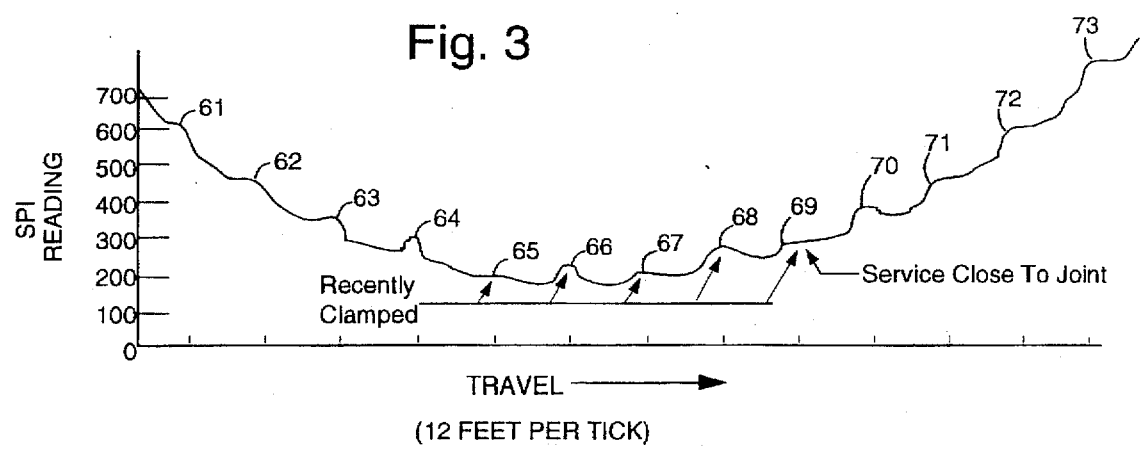
FIG. 3 is a graph of more test readings that were taken at various longitudinal points at the street surface along a twelve section length of an underground cast iron gas main pipeline similar to that shown in FIG. 1.

FIGS. 2 and 3 represent plots of actual measurements that were taken along a pipeline at the road surface of streets in New York. In FIG. 2 a series of signal voltage peaks 51-56 were plotted for a pipeline that had six joints electrically between the signal generator output connections. The first two signal voltage peaks, 51 and 52, were of lower magnitude because repair clamps had been applied to the respective joints. The signal voltage peak 54 is particularly symptomatic of a joint that requires drill-testing and possible excavation and repair. If trouble has been reported in the neighborhood of this particular run of joints, it is probable that the plot of FIG. 2 indicates that the source of the problem is at the joint represented by the highest magnitude signal voltage peak 54.

In FIG. 3, a series of signal power peaks 61-73, were plotted for a pipeline that had twelve joints connected electrically between the output signal generator 12 connections. A bathtub curve results because the peaks 64-69 are produced by lower pipeline current than the extrema where the probes 34 and 36 are closest. The peaks are individually identified by their local baselines, not by the average for the whole span of the test pipeline.

The importance of identifying and developing an efficient method for the surface pinpointing of bell joints is well established, because such joints in older gas distribution systems are the primary source of leaks and are the basis for a major portion of the cost of operation.

In general, there must be a significant difference in the signal conductance of the feature being located, compared to the adjacent pipeline conductance. There must be some reorientation of the field associated with each feature. The detection instrument used for pinpointing must observe and properly interpret the phenomena and discriminate against the effects of nearby interfering conductors and noise signals that are typical of the cast iron network environment.

Field tests conducted were directed toward finding out how strong an externally-detectable field could conveniently be generated on the cast iron joints and services. The optimum signal frequencies to use and what kind of receiver/detector unit were also of interest. Pipe joints that are zero-shorted can prevent a current from producing a signal gradient necessary for detection at the surface, so tests were needed to see if such effects actually manifest in the field.

The field and laboratory tests showed that only one in twenty joints tested was sufficiently electrically shorted so as to be virtually impossible to locate. The remaining joints exhibited resistance readings from 0.1 to 1.0 ohm with an average capacitance of 200 picofarads per inch of pipe diameter. Such characteristics clearly pointed to the use of audio frequencies, e.g., below ten KHz. It was subsequently found that 7800 hertz was a good frequency to use. On a six inch cast iron test line buried in ten kilohm per centimeter soil, the overall resistance of pipe measured about 9.7 ohms. The joints accounted for the great majority of this impedance. The shunting effect of surrounding soil was relatively insignificant.

The two output connections of the signal generator 12 should connect outside the span of joints to be located, but preferably by only one or two cast iron sections. The joint target area being searched is assumed to include from two to perhaps as many as eight or ten joints, as typically will be identified in the initial leak survey. Signal connections can be made with plunger bars or moderately sharpened probing bars that make contact with the cast iron pipeline, e.g., using drilled holes through the pavement where necessary for rapid and efficient access. Ideal connections are made with insulated rods, because no signal current is fed into the soil, thus avoiding the peak-masking effect otherwise likely around the nearest joint. Where parallel conductors are at least six or seven feet away, and where the search area includes just a few joints, it may be possible to work with one of the bar hole contacts in a near-miss condition, perhaps one or two inches off the pipeline. In many cases, the electrical circuit is adequately completed by the conductivity of the moist soil. Metal service lines, curb valves, drip pots, and the like, are usually acceptable substitutes for bar contacts. But such substitutes should not also connect to water pipes or other grounded utilities that can electrically shunt the gas main pipeline in the study area.

The signal generator 12 and its signal cables should be offset at least twelve feet laterally from the target line, except where the cables finally reach across to clamp onto the contact bars 34 and 36. The accuracy with which the cast iron centerline can be marked can be affected by the signal cables if they are close by. The magnetic field generated by the cables is as great as that generated by the pipe, the diameter of the respective conductors is of little consequence to the local field strength. Worse, the signal current on the cables between the signal generator 12 and probes 34 and 36 tends to capacitively couple to the earth. Rain, and other sources of surface dampness, greatly increase such capacitive effects which include dilution or weakening of the signal peaks. A sidewalk off to one side of the street paving is generally the best configuration, because the proximity coupling of signal into other mid-street conductors is minimized. Otherwise, undesirable magnetic coupling of signals can develop between two conductors that run in parallel. Surface contact readings by the receiver system 38 are preferably taken within a four inch tolerance band along the surface centerline.

The surface centerline can be accurately identified and marked by taking advantage of the introduced signal on the pipeline. The receiver system 38 can be used to take transverse readings across the track of the pipeline 14 to find its course beneath the surface. Where such surface centerline crosses grates, manhole covers or similar metallic items that are electrical short circuits, the signal measurements are preferably taken from points offset and clear of the obstacle by six or eight inches. Although weaker signal readings will be obtained, the characteristic signal power peaks of the joints will be evident on a lowered baseline.

Figure 4:
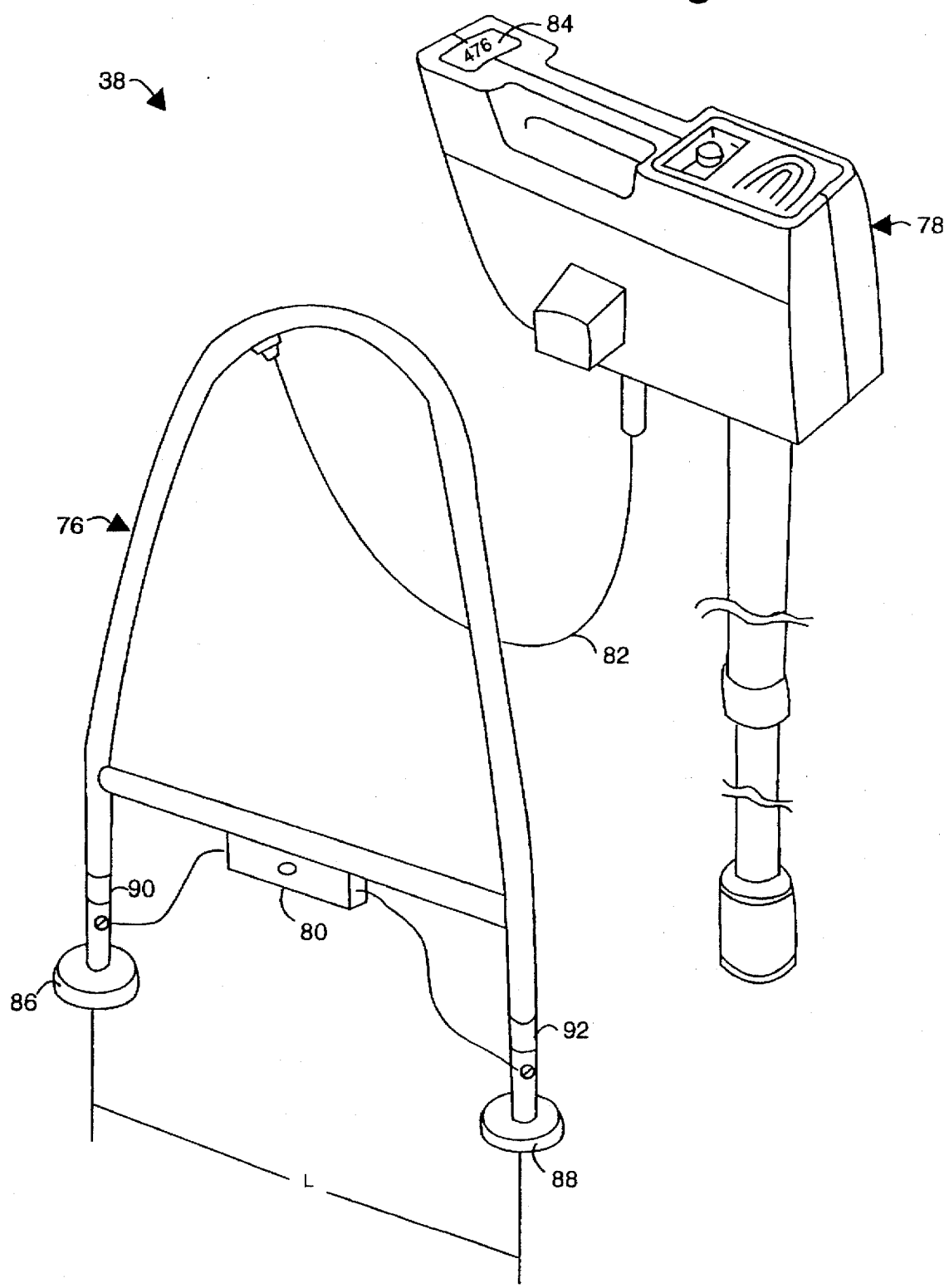
FIG. 4 is a perspective diagram of a receiver system useful in the method used in FIG. 1.

Referring to FIG. 4, in an exemplary embodiment, the receiver system 38 may comprise a contact frame 76 and a signal strength meter 78. A high impedance balanced-input preamplifier 80 amplifies the weak differential-mode signals detected close to the point of input, and translates this into a stronger common-mode signal over a cable 82. A digital readout 84 provides a user with a relative signal strength indication with high resolution. A pair of conductive pads 86 and 88 provide a high capacitance contact with the surface of the road 24, e.g., where "L" is about twenty-one inches and the conductive pads 86 and 88 are touched on the surface along the centerline of the pipeline 14. A pair of insulators 90 and 92 electrically isolate the conductive pads 86 and 88 from being shorted out by the rest of the frame.

In order to collect measurements faster and more efficiently, the conductive pads 86 and 88 can be substituted by conductive rubber wheels. An auxiliary wheel attached to an odometer may be used for gauging the longitudinal position along the pipeline 14.

In tests that were conducted in New York City and Binghamton, N.Y., the paths of cast iron pipelines were marked with the guidance of left-right instrument readings, so that frame contact readings could be maximized. Centerline marks were then spot checked by using a digital signal power indicator (SPI) of a research receiver. For example, the equipment and methods described by the present inventors in U.S. Pat. No. 5,001,430, issued Mar. 19, 1991 may be used to find such pipeline centerline. Furthermore the depth reading capability of that invention is often useful in confirming the identity of a particular pipeline when in a high utility density area. Such Patent is incorporated herein by reference. The gain of the preamplifier 80 was set during tests to produce mid to high levels without saturating the digital signal strength readings all along the pipeline's path. A full set of readings were taken for each run of joints. The spacing of the joint indications were compared against all available clues from construction drawings, curb marks, clamping/repair patches, and existing or subsequent excavations.

Such criteria helped determine the success rate of the various pinpointing test runs at each site. Signal peaks were observed, as in FIGS. 2 and 3, on a regular twelve foot basis within an eighteen inch tolerance. Missing joints were counted as errors. Grossly misplaced readings were discarded, unless they fell into a new twelve foot pattern, e.g., as caused by a makeup short length or special piece for a drip pot, T-connector, X-connector, etc. Readings with locations that conflicted with clear curb markings, construction drawings or visible joints in excavations were also counted as errors. A two foot measurement interval was used unless the signal gradient observed was unusually large, e.g., signal bleed-off which is common to larger diameter mains. In such instances, one foot measurement intervals were used to improve resolution. As each joint location was apparently being approached, the measurement intervals were reduced. First to twelve inches, then in four to six inch steps so that a signal maximum point could be identified. Where sharp drop-off points were not observed, the mid-points between two equal drop-off points were taken as the maximum signal point.

At the four residential test sites in New York City and Binghamton, the success rate ran from a low of sixty-seven percent to a high of ninety-four percent. Where signal drive test-pipe spans were limited to the range stated in the rules and definite contact was made at both ends of the test-pipe span, there was definite improvement of all peak signals and the minimum success rate was lifted to eighty percent.

At one intersection, no visible confirmation was possible at the time. But with only limited testing and connection points available, construction drawings and peak readings appeared to correlate in the seventy to eighty-five percent range. It is believed that improving the signal connection on the north end of the test-pipe span would have raised the rate by five to ten percentage points or more.

At sites in Binghamton, not actually being able to electrically contact the pipeline on most test-pipe spans dropped the success rate of identifying pipe joints to as low as thirty percent. In contrast, a moderate test-pipe span length and one good contact raised the success rate to sixty percent or more. It appeared that a minimum of seventy-five percent is achievable with two good contacts and a test-pipe span that includes six to eight joints. These two particular sites have very high recorded clamping ratios, and they were full of water service lines in apparent near-contact with the cast iron gas main pipeline. Cross couplings between the gas and water systems were evident in many of the test-pipe spans tested.

Every time that it proved possible the issue of signal peak longitudinal bias was reviewed. Some peak reading bias was observed that favored the bell side of joints. Subsequent excavations in Manhattan indicated that the readings indicate a peak biased approximately eighteen inches to the bell side of the face., e.g., for a six inch cast iron pipeline that is forty inches deep.

A follow-up study confirmed that the peak signal power reading can always be expected to be an average of a foot toward the bell side. However, the exact amount will vary depending on the buried depth of the pipeline and its diameter. Clamping of the pipe joints tends to counteract such bias effects produced by the bell, but the degree of counteraction is very dependent on the particular clamp design involved.

Strong signal currents were observed in the soils immediately surrounding the vertical surfaces of the probes. This limited identifying joints to a range less than the whole included length of the test-pipe span. It was therefore concluded that the probes 34 and 36 (FIG. 1) preferably comprise slim insulated contact rods with hardened tips to replace the impact or probing bars once they had been used to punch the larger holes to the pipeline.

Thus current gradients can be used in a cast iron joint/ fracture pinpointing method. The surface detection of signal leakage earth gradients depends on signal current passing through joints with sufficient series impedance. The basic "Operating Rules" have been established and sufficiently verified for further successful testing and use of the system.

The percentage of joints with sufficient impedance to allow this mode of detection can now be estimated at: Ninety-five to one hundred percent with unclamped joints four to eight inches in diameter. Ninety to ninety-five percent with unclamped joints ten inches and larger. The impedance degradation effect of clamps varies from a dead short, common for new construction, to almost zero effect due to subsequent corrosion.

The use of inductive single and differential antennas was also evaluated. However, of the two options available for sensing the joint leakage field, the ground contact frame has proven superior, because it has minimum sensitivity to lateral currents and their fields. These currents have proven to be undesirable secondary products of the basic phenomenon we are tracking or are not related at all. Starting with a peak signal survey of a given test-pipe span, the role of interpolation by a street-wise instrument operator is evident, and would round up the success rate in the same way that operators relate to and depend on pipe and cable locating instruments.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for locating the joints and fracture points of underground jointed metallic pipes, the method comprising the steps of:

connecting a sequential series of underground jointed-metallic-pipe pipeline sections with joints across a signal generator for passing an audio-frequency signal through said sections and joints in series;

locating the centerline of sequential series of underground jointed-metallic-pipe pipeline sections directly above on the surface of the ground to plot a surface centerline;

collecting a set of relative linear positions and a corresponding set of measurements of the signal voltage of said audio-frequency signal that couples to the surface along said surface centerline; and estimating and equating the location of said joints and fracture points of said underground jointed-metallic-pipe pipeline to be directly below points on said surface centerline that provide peaks in signal voltage measured in the step of collecting measurements.

2. The method of claim 1, wherein:

the step of connecting includes connecting a signal power generator with an output power of about sixty watts and a frequency output of about 7800 hertz.

3. The method of claim 1, wherein:

the step of connecting includes laterally offsetting said signal power generator on the surface away from said surface centerline.

4. The method of claim 1, wherein:

the step of collecting includes connecting a receiver with a digital-readout signal voltage indicator responsive to signals with a frequency of about 7800 hertz.

5. The method of claim 4, wherein:

the step of collecting includes connecting said receiver to receive said audio-frequency signal with a ground contact frame having a pair of conductive foot pads connected to a preamplifier.

6. The method of claim 5, wherein:

the step of collecting includes spacing said pair of conductive foot pads about twenty-one inches apart and taking readings every two feet and more frequently in the vicinity of a local peak reading in order to determine a position for a peak reading to within four inches.

7. The method of claim 1, wherein:

the step of collecting includes collecting said measurements within four inches of said surface centerline.

8. The method of claim 1, wherein:

the step of estimating includes a bias of about one linear foot on the surface to account for bell-shaped pipeline joint effects.

9. A cast-iron-gas-main-pipeline joint locator system, comprising:

signal generator means for passing an audio-frequency alternating current through a buried cast-iron-gas-main pipeline with electrical impedance joints between sections that are shunted by soil;

pipeline location means for marking the path of said buried cast-iron-gas-main pipeline above a ground surface;

ground surface contact means for electrically-connecting to two points of said ground surface overlying said soil and said buried cast-iron-gas-main pipeline; and signal voltage indication means for measuring the voltage between said two points of said ground surface that is representative of a fringing flux or "current flux" of said audio-frequency alternating current that exists across each of said electrical impedance joints between sections;

wherein peaks of said fringing flux or "current flux" of said audio-frequency alternating current are assumed to be associated with a leaking pipe joint and therefore indicate the location of said leaking joint by associating the collection of a voltage peak by the signal voltage indication means with the physical joint from which it was collected.

10. The system of claim 9, wherein:

the signal generator means outputs about a sixty watt signal at about 7800 hertz that is crystal controlled to be stable; and the signal voltage indication means includes a crystal controlled oscillator and phase locked loop to exclude all but signals originating from the signal generator means.

* * * * *